(12) United States Patent
Feather et al.

(10) Patent No.: US 7,861,031 B2
(45) Date of Patent: Dec. 28, 2010

(54) ACCESS CONTROL MANAGEMENT

(75) Inventors: Stanley S. Feather, Ft. Collins, CO (US); Curtis C. Ballard, Ft. Collins, CO (US); Steven Maddocks, Ft. Collins, CO (US); Shiraz Billimoria, Giffor (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 423 days.

(21) Appl. No.: 11/712,661

(22) Filed: Mar. 1, 2007

(65) Prior Publication Data

US 2008/0215806 A1    Sep. 4, 2008

(51) Int. Cl.
*G06F 12/00* (2006.01)
(52) U.S. Cl. .................................. 711/111; 711/154
(58) Field of Classification Search ................... 711/154, 711/112; 707/100
See application file for complete search history.

(56) References Cited

U.S. PATENT DOCUMENTS

| | | | |
|---|---|---|---|
| 5,923,876 A | 7/1999 | Teague |
| 6,161,192 A | 12/2000 | Lubbers |
| 6,170,063 B1 | 1/2001 | Golding |
| 6,295,578 B1 | 9/2001 | Dimitroff |
| 6,397,293 B2 | 5/2002 | Shrader |
| 6,453,419 B1 | 9/2002 | Flint |
| 6,487,636 B1 | 11/2002 | Dolphin |
| 6,490,122 B1 | 12/2002 | Mueller et al. |
| 6,493,656 B1 | 12/2002 | Houston |
| 6,505,268 B1 | 1/2003 | Schultz |
| 6,523,749 B2 | 2/2003 | Reasoner |
| 6,546,459 B2 | 4/2003 | Rust |
| 6,560,673 B2 | 5/2003 | Elliott |
| 6,587,962 B1 | 7/2003 | Hepner |
| 6,594,745 B2 | 7/2003 | Grover |
| 6,601,187 B1 | 7/2003 | Sicola |
| 6,606,627 B1 | 8/2003 | Guthrie |
| 6,606,690 B2 | 8/2003 | Padovano |
| 6,609,145 B1 | 8/2003 | Thompson |
| 6,629,108 B2 | 9/2003 | Frey |
| 6,629,273 B1 | 9/2003 | Patterson |
| 6,643,795 B1 | 11/2003 | Sicola |
| 6,647,514 B1 | 11/2003 | Umberger |

(Continued)

OTHER PUBLICATIONS

United States Patent Office, U.S. Appl. No. 11/879,399, Office Action dated Jan. 11, 2010, pp. 1-9 and attachments.

(Continued)

*Primary Examiner*—Pierre-Michel Bataille (57) ABSTRACT

In one embodiment, a cartridge library comprises a library controller comprising a first processor module and a memory medium communicatively connected to the processor module, and a cartridge drive controller comprising a second processor module and a memory medium communicatively connected to the processor module. The cartridge drive controller comprises logic instructions stored on a computer readable medium which, when executed, cause the first processor module to receive, from a management component coupled to the cartridge library, at least one access control parameter, wherein the access control parameter identifies at least one of a user, a server, a command, or a time, record, in a memory medium coupled to the cartridge library, the at least one access control parameter; receive a request for at least one resource of the cartridge library; and use the access control parameter in determining whether to grant access to the at least one resource of the cartridge library.

26 Claims, 5 Drawing Sheets

U.S. PATENT DOCUMENTS

| | | |
|---|---|---|
| 6,658,590 B1 | 12/2003 | Sicola |
| 6,663,003 B2 | 12/2003 | Johnson |
| 6,681,308 B1 | 1/2004 | Dallmann |
| 6,708,285 B2 | 3/2004 | Oldfield |
| 6,715,101 B2 | 3/2004 | Oldfield |
| 6,718,404 B2 | 4/2004 | Reuter |
| 6,718,434 B2 | 4/2004 | Veitch |
| 6,721,902 B1 | 4/2004 | Cochran |
| 6,725,393 B1 | 4/2004 | Pellegrino |
| 6,742,020 B1 | 5/2004 | Dimitroff |
| 6,745,207 B2 | 6/2004 | Reuter |
| 6,763,409 B1 | 7/2004 | Elliott |
| 6,772,231 B2 | 8/2004 | Reuter |
| 6,775,790 B2 | 8/2004 | Reuter |
| 6,795,904 B1 | 9/2004 | Kamvysselis |
| 6,802,023 B2 | 10/2004 | Oldfield |
| 6,807,605 B2 | 10/2004 | Umberger |
| 6,817,522 B2 | 11/2004 | Brignone |
| 6,823,453 B1 | 11/2004 | Hagerman |
| 6,839,824 B2 | 1/2005 | Camble |
| 6,842,833 B1 | 1/2005 | Phillips |
| 7,085,884 B2 | 8/2006 | Torrey |
| 7,207,041 B2 * | 4/2007 | Elson et al. ............. 718/104 |
| 7,386,480 B2 * | 6/2008 | Sarig ...................... 705/26 |
| 2002/0004883 A1 * | 1/2002 | Nguyen et al. ............ 711/111 |
| 2002/0019863 A1 | 2/2002 | Reuter |
| 2002/0019908 A1 | 2/2002 | Reuter |
| 2002/0019920 A1 | 2/2002 | Reuter |
| 2002/0019922 A1 | 2/2002 | Reuter |
| 2002/0019923 A1 | 2/2002 | Reuter |
| 2002/0048284 A1 | 4/2002 | Moulton |
| 2002/0188800 A1 | 12/2002 | Tomaszewski |
| 2003/0051109 A1 | 3/2003 | Cochran |
| 2003/0056038 A1 | 3/2003 | Cochran |
| 2003/0063134 A1 | 4/2003 | Lord |
| 2003/0074492 A1 | 4/2003 | Cochran |
| 2003/0079014 A1 | 4/2003 | Lubbers |
| 2003/0079074 A1 | 4/2003 | Sicola |
| 2003/0079082 A1 | 4/2003 | Sicola |
| 2003/0079083 A1 | 4/2003 | Lubbers |
| 2003/0079102 A1 | 4/2003 | Lubbers |
| 2003/0079156 A1 | 4/2003 | Sicola |
| 2003/0084241 A1 | 5/2003 | Lubbers |
| 2003/0101318 A1 | 5/2003 | Kaga |
| 2003/0110237 A1 | 6/2003 | Kitamura |
| 2003/0126315 A1 | 7/2003 | Tan |
| 2003/0126347 A1 | 7/2003 | Tan |
| 2003/0140191 A1 | 7/2003 | McGowen |
| 2003/0145045 A1 | 7/2003 | Pellegrino |
| 2003/0145130 A1 | 7/2003 | Schultz |
| 2003/0170012 A1 | 9/2003 | Cochran |
| 2003/0177323 A1 | 9/2003 | Popp |
| 2003/0187847 A1 | 10/2003 | Lubbers |
| 2003/0187947 A1 | 10/2003 | Lubbers |
| 2003/0188085 A1 | 10/2003 | Arakawa |
| 2003/0188114 A1 | 10/2003 | Lubbers |
| 2003/0188119 A1 | 10/2003 | Lubbers |
| 2003/0188153 A1 | 10/2003 | Demoff |
| 2003/0188218 A1 | 10/2003 | Lubbers |
| 2003/0188229 A1 | 10/2003 | Lubbers |
| 2003/0188233 A1 | 10/2003 | Lubbers |
| 2003/0191909 A1 | 10/2003 | Asano |
| 2003/0191919 A1 | 10/2003 | Sato |
| 2003/0196023 A1 | 10/2003 | Dickson |
| 2003/0212781 A1 | 11/2003 | Kaneda |
| 2003/0229651 A1 | 12/2003 | Mizuno |
| 2003/0236953 A1 | 12/2003 | Grieff |
| 2004/0019740 A1 | 1/2004 | Nakayama |
| 2004/0024838 A1 | 2/2004 | Cochran |
| 2004/0024961 A1 | 2/2004 | Cochran |
| 2004/0030727 A1 | 2/2004 | Armangau |
| 2004/0030846 A1 | 2/2004 | Armangau |
| 2004/0049634 A1 | 3/2004 | Cochran |
| 2004/0078638 A1 | 4/2004 | Cochran |
| 2004/0078641 A1 | 4/2004 | Fleischmann |
| 2004/0128404 A1 | 7/2004 | Cochran |
| 2004/0168034 A1 | 8/2004 | Homma et al. |
| 2004/0215602 A1 | 10/2004 | Cioccarelli |
| 2004/0230859 A1 | 11/2004 | Cochran |
| 2004/0267959 A1 | 12/2004 | Cochran |
| 2005/0240649 A1 | 10/2005 | Elkington |
| 2008/0022370 A1 * | 1/2008 | Beedubail et al. ............. 726/4 |

OTHER PUBLICATIONS

United States Patent Office, U.S. Appl. No. 11/879,399 Final Rejection dated Jun. 11, 2010, pp. 1-11 and attachments.

* cited by examiner

| Host Server Identifier 410 | User Identifier 415 | LUN Identifier 420 | Command 425 | Day 430 | Start Time 435 | End Time 440 |
|---|---|---|---|---|---|---|
| 50:06:0B:00:00:7F:6A:70 | ABC123 | 1 | Read | Sunday | 1200 | 0400 |
| | | | | Monday | 0200 | 2300 |
| | | | | Tuesday | 0200 | 2300 |
| | | | | Wednesday | 0300 | 1400 |
| | | | | Thursday | 0800 | 2000 |
| | | | | Friday | 0900 | 1700 |
| | | | | Saturday | 0000 | 2300 |
| | | | Write | Sunday | XXXX | XXXX |
| | | | | Monday | 0800 | 1700 |
| | | | | Tuesday | 0800 | 1700 |
| | | | | Wednesday | 0800 | 1400 |
| | | | | Thursday | 0800 | 2000 |
| | | | | Friday | 0900 | 1700 |
| | | | | Saturday | XXXX | XXXX |
| | | | Copy | Sunday | XXXX | XXXX |
| | | | | Monday | 0800 | 0800 |
| | | | | Tuesday | 0800 | 0800 |
| | | | | Wednesday | 0800 | 0800 |
| | | | | Thursday | 0800 | 0800 |
| | | | | Friday | 0900 | 0900 |
| | | | | Saturday | XXXX | XXXX |

ACCESS CONTROL MANAGEMENT

BACKGROUND

The described subject matter relates to electronic computing, and more particularly to access control management in tape libraries that provide mass storage.

Storage automation systems, e.g., data cartridge storage systems, typically include a host computer and a data storage device. The data storage device typically comprises a cartridge storage element, input/output components, and a moveable cartridge access component, sometimes referred to as a "picker." The cartridge storage element stores a plurality of data cartridges in an array, and each data cartridge in the array has an associated storage position within the cartridge storage element.

During operation, the data storage device may receive, from the host computer, a request for retrieval of a specified data cartridge. The storage device determines, based on the request received from the host computer, a data cartridge position for the requested data cartridge. The movable cartridge access device then moves to that position, retrieves the requested cartridge from the cartridge storage element, moves to the position of an input/output component, for example, a data cartridge drive, and loads the data cartridge into the data cartridge drive.

Moreover, the data storage device may also receive, from the host computer, a request to return a previously retrieved data cartridge to the storage element. The storage device determines, based on such a request, to return received from the host computer, a data cartridge position for storing the foregoing data cartridge. The movable cartridge access device then retrieves the data cartridge from the input/output component, moves the data cartridge to the determined data cartridge location and loads the data cartridge into the cartridge storage element.

Typically, the data storage device further comprises a controller, which is configured to receive requests, such as the cartridge retrieval requests described above, from the host computer and manage the operation of the device in response to the requests. During operation of the storage device, the controller may retain operational information that is used by the controller for operation and management of the device. A data storage device may also comprise a separate management controller which is configured to receive requests such as, e.g., configuration settings or cartridge retrieval requests from a management computer or a person at a management console.

Owners or administrators of storage systems may wish to regulate access to resources managed by the storage system.

DETAILED DESCRIPTION

Described herein are exemplary tape library architectures, and methods for access control management in a cartridge drive system. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

In exemplary embodiments, the architectures and methods may be implemented in tape storage libraries such as the tape storage libraries described in U.S. Pat. Nos. 5,926,341; 6,028,733; or 6,421,306, commonly assigned to the assignee of the present application, the disclosures of which are incorporated by reference herein in their entirety.

Figure 1:
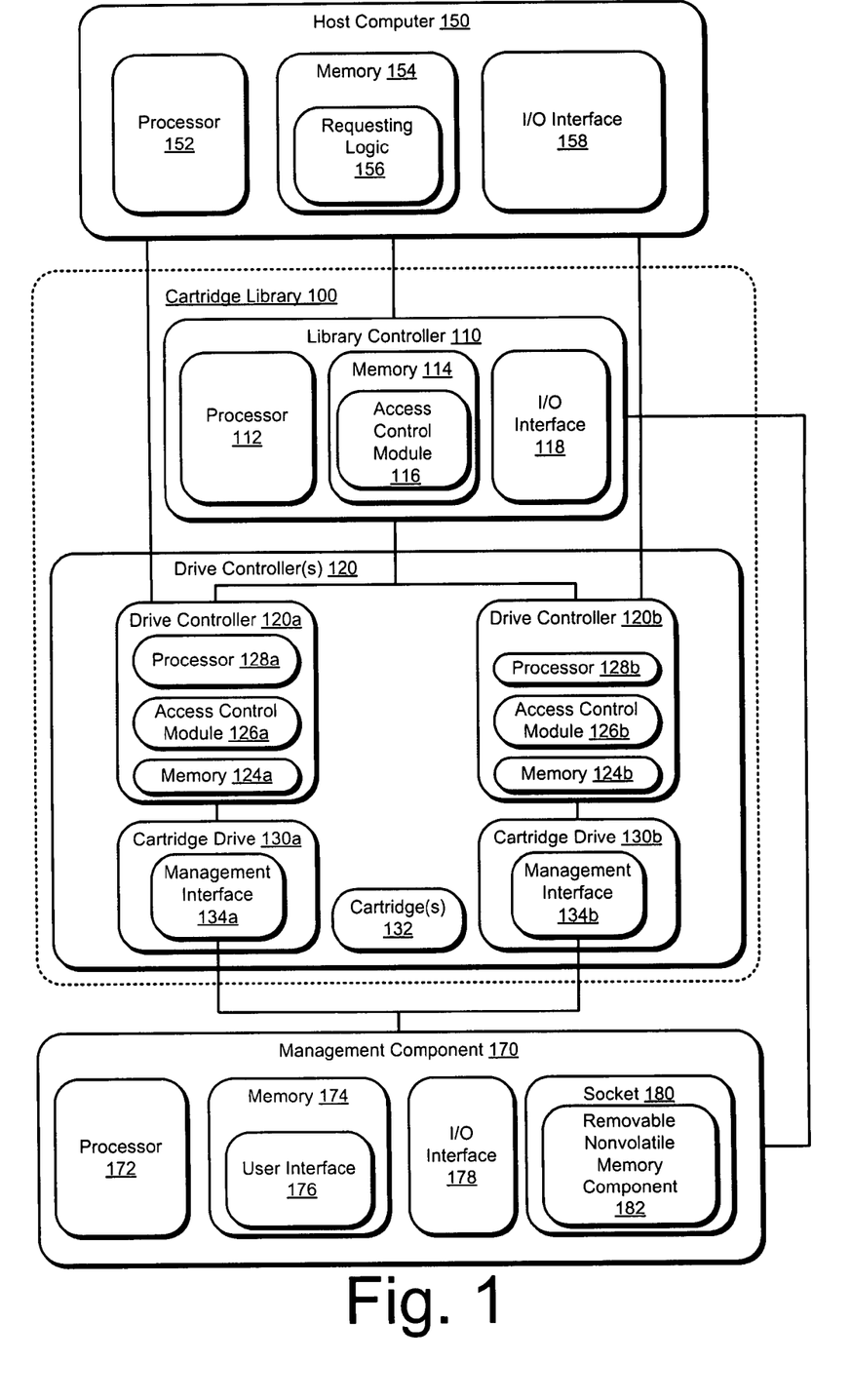
FIG. 1 is a schematic illustration of an embodiment of a cartridge library.

FIG. 1 is a schematic illustration of an exemplary embodiment of a tape library 100. The tape library 100 includes at least one library controller module 110, including a processor 112 which is coupled to a memory medium 114, and one or more cartridge drive controllers 120, which are coupled to (or contained within) a plurality of cartridge drives 130a, 130b via one or more interface buses, such as a small computer system interface (SCSI) bus. The library controller 110 is coupled to the cartridge drive controllers 120 via one or more interface buses such as, e.g., an RS422 bus or an inter-integrated circuit (I2C) bus. It is noted that the library controller 110 can be embodied as a separate component (as shown), or can be co-located with one or more of the driver controllers 120, or within a separate host computer 150.

The library controller 110 may be implemented as a software module that runs on a general purpose processing unit of the tape library, or as a special-purpose chipset. In some embodiments, library controller 110 may include a processor 112, a memory module 114 and an input/output (I/O) interface 118. Memory module 114 may include an access control module 116, the operation of which is discussed in greater detail below.

In some embodiments the host computer 150 may be connected to the drive controllers and the library controller by another bus. By way of example, the host computer 150 may be connected to the library and drives using SCSI and the library may be connected to the drives using RS422.

The cartridge drive controllers 120 coordinate data transfer to and from the one or more cartridge drives 130a-130b. Cartridge drive controllers 120a and 120b have respective processors 128a and 128b and respective memories 124a and 124b. Processors 128a, 128b may be implemented as general purpose processors that may be configured to execute logic instructions in the respective memories 124a, 124b, or as special purpose processors adapted to implement logic instructions embodied as firmware, or as ASICs. The memories 124a and 124b may be implemented as battery-backed, non-volatile RAMs (NVRAMs). Although only two controllers 120a and 120b are shown and discussed generally herein, aspects of this invention can be extended to other multi-controller configurations where more than two controllers are employed. Further, driver controllers 120 may include access control modules 126, which implement logic to manage access to data on one or more cartridges 132 managed by the system 100.

The cartridge drives 130a, 130b are configured to receive a tape cartridge 132a, 132b, respectively. Input/Output (I/O) operations requested by host computer 150 may be executed against data stored in the respective tape cartridges 132a, 132b.

In some embodiments, tape library 100 may be coupled to a management component 170. Management component 170 may be embodied as an integrated computing device such as, e.g., a blade server implemented on a printed circuit board (PCB) that couples to an expansion slot in tape library 100. Alternatively, management component 170 may be embodied as a stand-alone computing device such as, e.g., a server, coupled to tape library 100 via a communication link, such that management component 170 may be coupled to multiple tape libraries 100.

Management component 170 includes a processor 172, a memory module 174, and an I/O interface 178. Processor 172 may be embodied as a general purpose computer processor. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. Memory 174 may include random access memory (RAM), dynamic RAM (DRAM), synchronous DRAM (SDRAM), and the like. Memory 174 may include an operating system to manage operations of management component 170. Operating system 140 may be embodied as a UNIX operating system or any derivative thereof (e.g., Linux, Solaris, etc.) or as a Windows® brand operating system, or other operating systems. The operating system may include (or manage) one or more communication interfaces such as I/O interface 178 to transceive data packets and/or data streams from a remote source. The I/O interface 178 may include a parallel port (e.g., a small computer system interface (SCSI) port), a serial port (e.g., an RS-232C or an RS-422 port) or other type of known or future developed data communication port.

In some embodiments management component 170 includes a removable non-volatile memory component (RNMC) 182 coupled via a socket 180, which provides a conductive connection between the RNMC 182 and other components of the management component 170. The RNMC 182 may store operational data associated with the tape library 100. For example, during a cartridge request and load, process errors may occur. Such errors may include mechanical failures, for example a loading device may malfunction, or software errors. When an error occurs, information for recovery of the tape library 100 is stored to the RNMC 182. As an example, data stored to the RNMC 182 may comprise information describing the position of the various mechanical components (e.g., movable cartridge access device) at the point of failure of the load process. Further, the RNMC 182 can store software and firmware capable of operating or managing the tape library 100 and its sub-components. Further, as described, below, the RNMC 182 may store access control management data for the tape library 100.

Figure 2:
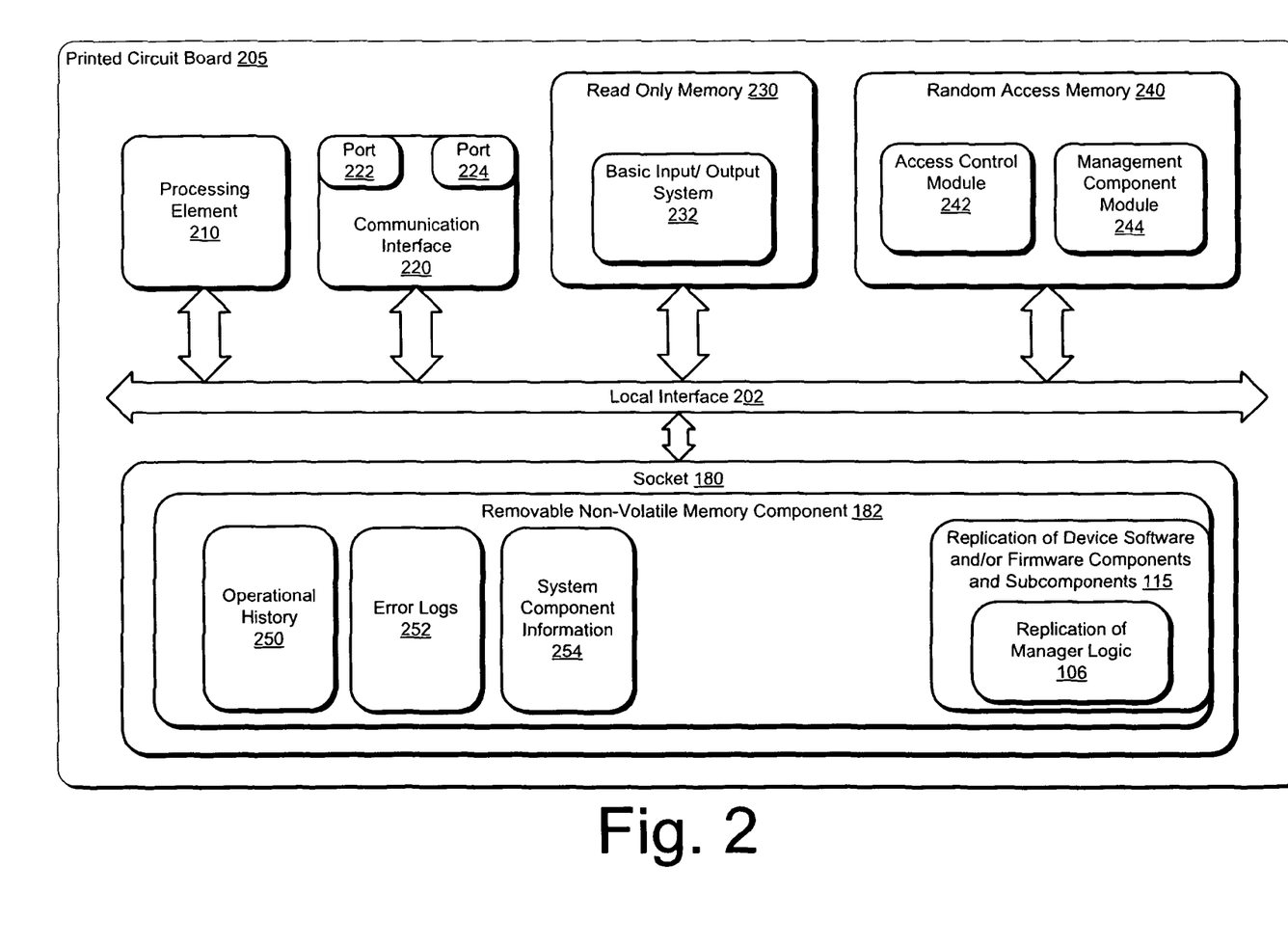
FIG. 2 is a schematic illustration of an embodiment of a management component.

FIG. 2 is a schematic illustration of an embodiment of a management component, such as management component 170 depicted in FIG. 1. Referring to FIG. 2, management component 170 of FIG. 1 may be mounted on a circuit board 205. Management component module 170 comprises one or more system processing elements 210, such as a digital signal processor (DSP) or a central processing unit (CPU) that communicates with other elements within the management component 170 via a local interface 202, which can include one or more buses.

Management component 170 may further comprise read-only memory (ROM) 230 and random access memory (RAM) 240. The ROM 230 preferably stores a basic input/output system (BIOS) 232, which enables the management component module 244 to become operable without accessing additional software or firmware. The operation and functionality of BIOS 232 is discussed further below.

Circuit board 205 further comprises a communication interface 220, which in turn comprises one or more ports 222, 224. One of the ports 222 may be utilized to exchange data with the host computer 150. The other port 224 may be used to access information related to a 130a, 130b in tape library 100.

As described above, in some embodiments the management component 170 may be implemented as an integral component of tape library 100. In other embodiments the management component 170 may be integrated as a separate computing device which may be located remote from the storage device and connected to the tape library 100 via a communication network. Further, management component 170 may be coupled to multiple tape libraries which may be co-located in a single facility or may be geographically remote.

As shown by FIG. 2, in some embodiments each of the components of the management component module 244 may reside on a single printed circuit board (PCB) 205. However, in other embodiments, the management component 170 components may reside on multiple PCBs and/or be interconnected via other types of known or future-developed devices. The PCB 205 can interface with the tape library 100 via an expansion slot, as a daughterboard or as a controller board or via a communication link.

In some embodiments the PCB 205 comprises a socket 180 to which the RNMC 182 is coupled. RNMC 182 may be implemented as compact flash memory, and the 180 residing on the PCB 205 may comprise smart media card connectors, compact flash card connectors, secure digital card connectors, multi media card connectors, memory stick card connectors, or other known or future-developed chip interfaces that enable insertion and removal of the RNMC 182.

In some embodiments RNMC 182 stores operational data, including, but not limited to error logs 252, system component information 254, and copies of software and/or firmware for various components and/or sub-components of the system.

When an event such as, e.g., a read or write, load/unload, retry or error occurs during operation of the tape library 100, a management interface 134 in cartridge drive 132 detects the event and generates a signal in response to the event. Further, the management interface 134 may write information about the event to the error logs 252 in the RNMC 182, textual or symbolic data indicative of the detected error. In addition, as normal operational events occur, for example when a cartridge is retrieved from the tape library 100 or the cartridge drive 130 or when a read or write begins to a cartridge loaded into the cartridge drive 130, the management interface 134 may write, to the operational history 250, textual or symbolic data indicative of normal events that occur during operation.

A management component module 244 may be configured to periodically perform tests on the tape library 100 and store results of the tests in the RNMC 182. Similarly, the management component module 244 may periodically perform a hardware inventory of the cartridge library 100 to determine if new hardware has been added. If the management component module 244 performs an inventory and discovers new hardware components, then the management component module 244 may download to the system component information 254 of the RNMC 182, data indicative of the new hardware components. Note that the system component information 254 may also comprise serial numbers, warranty information, or maintenance information related various components of the RNMC 182.

The management component module 244 may use the data in the RNMC 182 to determine at what point during a process an error occurred. For example, the operational history 250 may indicate that a cartridge 132 was retrieved upon request, but the error logs 252 may indicate that the cartridge 132 was not loaded into the cartridge drive 130. Therefore, to initiate recovery, the manager logic 100 may retrieve the error log information representing the failed event and, based on this information determine that the first step in the recovery process is to return the cartridge 132 to a storage rack. Thereafter, the cartridge library can operate as normal, waiting for a request for a cartridge 132.

When power is provided to the PCB 205, the BIOS 232 executes at power-up. When the management component module 244 is implemented in software, the logic instructions comprising the management component module 244 may be stored in the RAM 240. Alternatively, the logic instructions comprising the management component module 244 may be stored in the RNMC 182, and the BIOS 232 may be configured to retrieve the logic instructions from the RNMC 182 and write the logic instructions into RAM 93 at power-up. The logic instructions may then be executed by the processing element 210. In addition, other software and/or firmware stored on the RNMC 182 for operating other components of the cartridge library 100 can be loaded and executed.

In some embodiments, a computing device such as, e.g., a computer (not specifically shown) or some other data communication device may be connected to one of the ports 222 of communication interface 220. This computer may be configured with a utility or a graphical user interface (GUI) that enables a user of the laptop to access the data stored on the RNMC 182. For example, a user could copy software and/or firmware revisions for the hardware components of the cartridge library to the RNMC 182, thereby non-invasively updating the software and/or firmware. Note that software and/or firmware upgrades could also be performed by removing the RNMC 182 from the printed circuit board 205, copying software and/or firmware upgrades to the RNMC 182 while the RNMC 182 is detached from the circuit board 205, and reinserting the RNMC 182 into the circuit board 205. The ports 222 can be configured to communicate via RS-232, RS-422, Ethernet, or any other known or future-developed protocols.

Figure 3:
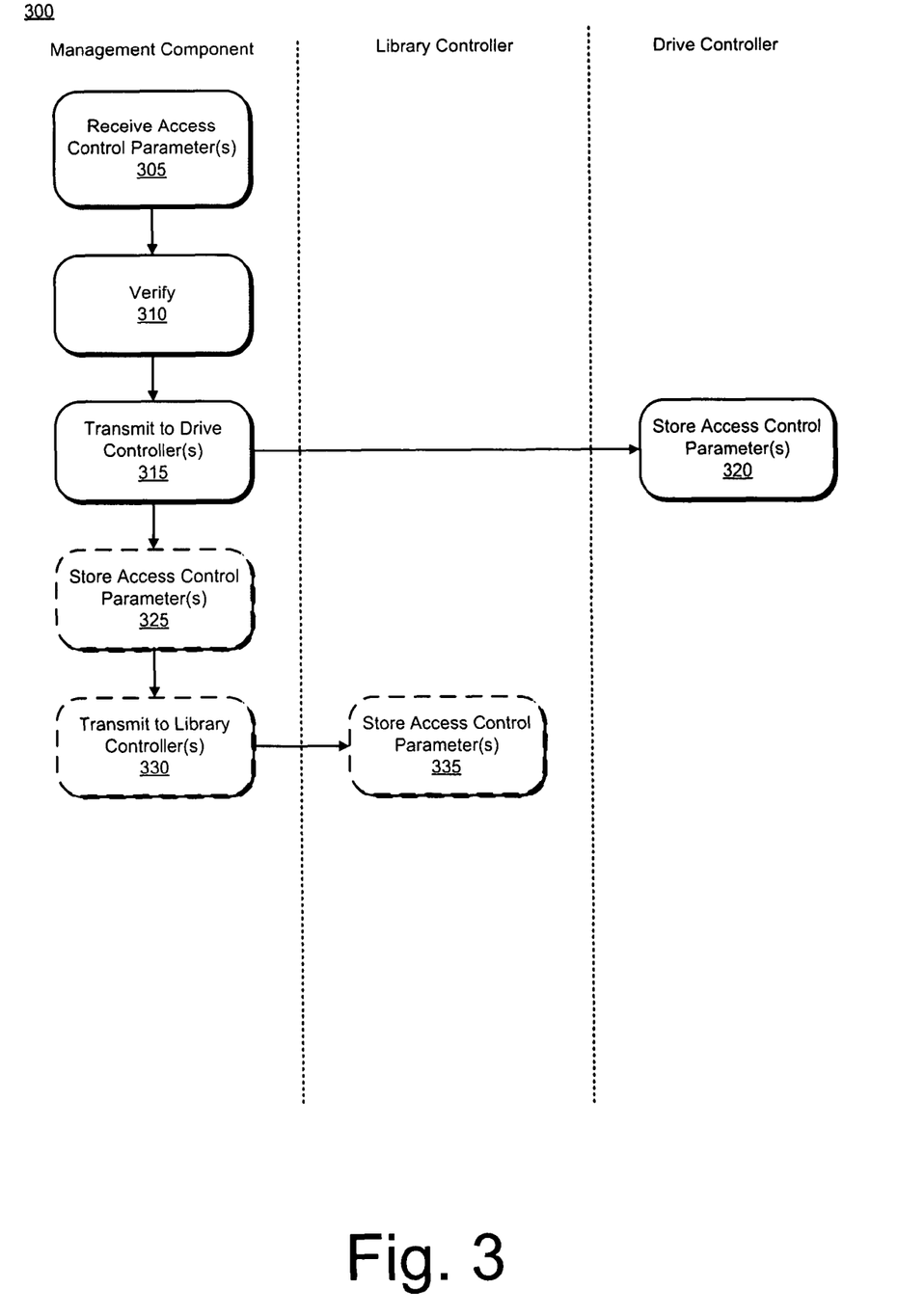
FIG. 3 is a flowchart illustrating operations in an embodiment of a method for obtaining access control parameters.

Operations for access control management in a cartridge library will be explained with reference to FIGS. 3-5. FIG. 3 is a flowchart illustrating operations in an embodiment of a method for obtaining access control parameters. Referring to FIG. 3, at operation 305 at least one access control parameter is received in access control module 242. In some embodiments an administrator or other authorized user of the cartridge library 100 may input at least one access control parameter to the access control module 242. For example, an administrator may establish a connection with access control module 242 via the communication interface 220 on circuit board 205 to interact with a user interface established by access control module 242.

In some embodiments the at least one access control parameter may identify at least one of a user, a server, a command, or a time. As used herein, the term "user" may correspond to a human user of cartridge library 100, a computer such as, e.g., a host computer 150, or a combination thereof. An access control parameter may also identify a specific resource managed by cartridge library 100. For example, an administrator may enter a set of access control parameters that authorizes a specific user of cartridge library 100 specific command rights over specific storage resources during specific periods of time. Similarly, an administrator may enter a set of access commands that limit a user's ability to perform at least one command on at least one resource of the cartridge library during at least one time period.

At operation 310 the access control parameter input is verified. In some embodiments the access control module 242 performs at least one test on the access data. For example, access control module 242 may perform a test to ensure that the administrator entering the data has appropriate administrative rights to enter the access control parameters. Further, access control module 242 may verify that the resource identified in an access control parameter is a valid resource in the cartridge library 100. For example, an access control parameter may identify a cartridge identifier associated with a specific cartridge or a Logical Unit Number (LUN) associated with a specific segment of storage. Access control module 242 may verify that the specific resource identified in the access control parameters valid within cartridge library 100.

In some embodiments, after the access control parameters are verified, they are sent to the drive controller(s) 120 (operation 315) which, in operation 320, store the access control parameters. For example, the access control module 126 of drive controller(s) 120 may include logic to manage one or more data tables that store access control parameters for cartridge library 100. The data tables may be stored in the memory module 124 of drive controller 120 or in a magnetic or optical storage medium coupled to drive controller 120.

Figure 4:
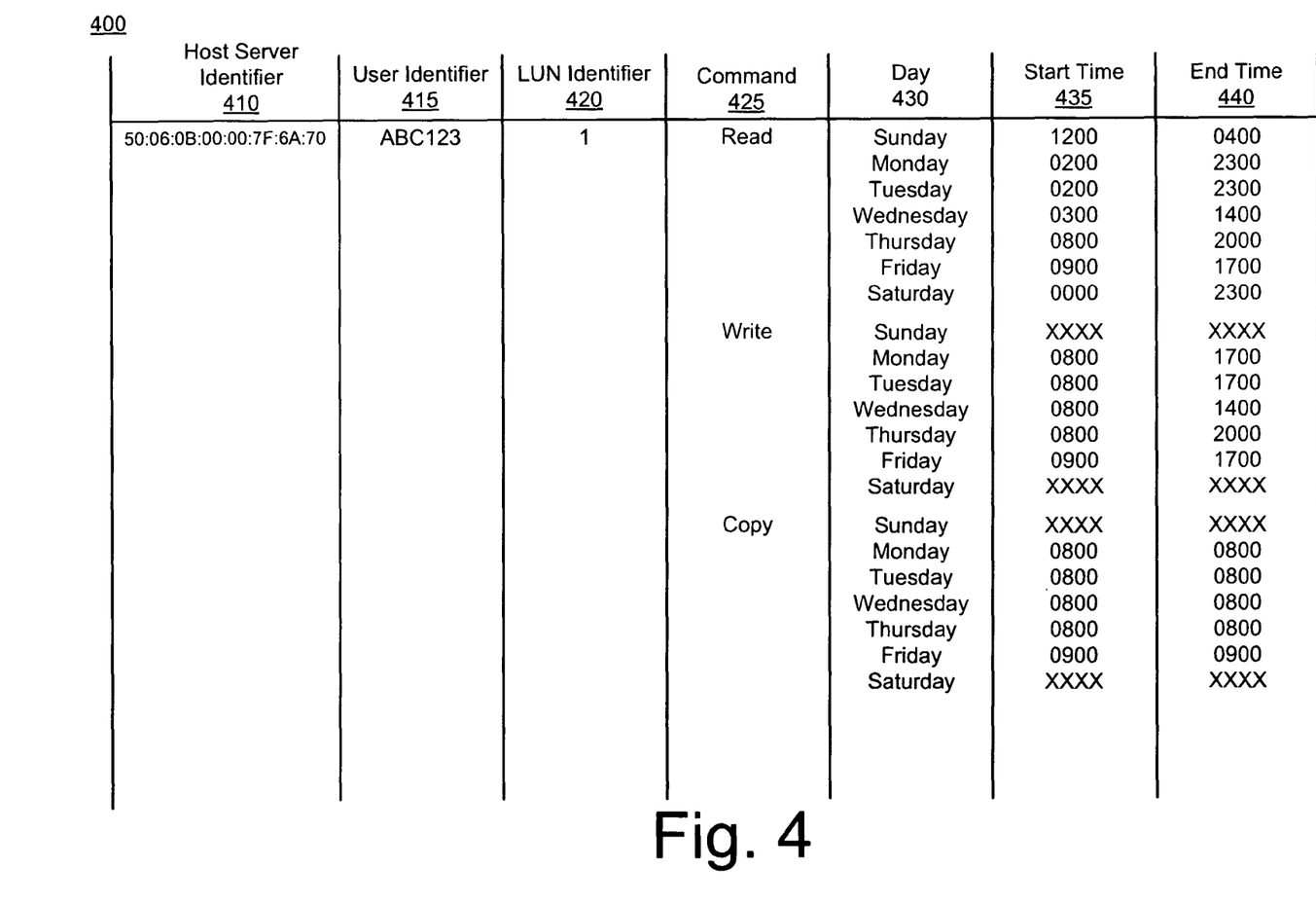
FIG. 4 schematic illustration of a data table for storing access control parameters.

FIG. 4 schematic illustration of one embodiment of a data table 400 for storing access control parameters. Referring to FIG. 4, in some embodiments, data table 400 may store access control parameters as a series of records that includes, for example, a world wide name 410, a user identifier 415, a LUN identifier 420, a command identifier 425, a day 430, a start time 435, and a stop time 440. Thus, for example, an administrator may specify that a particular user and/or host server is authorized to execute a read command on a specific LUN between 12:00 and 4:00 on Sunday, and between 2:00 AM 11:00 PM on a Monday and Tuesday, and so forth. Similarly, the administrator may authorize specific times and dates for write commands, copy commands, and other commands possible in the cartridge library 100. Access control module 126 may organize and store the access control parameters in a suitable data file such as, e.g., a database file.

Referring back to FIG. 3, in some embodiments the access control parameters may be stored (operation 325) in association with the management component 170 in lieu of, or in addition to, the drive controller memory 124. For example, an access control module 242 may be encoded as logic instructions stored in RAM 240 (or in RNMC 182). Access control module 242 may receive and verify the access control parameters entered by an administrator and may store the parameters in a memory module such as RAM 240, RNMC 182, or in a memory store coupled to access control module 242. In virtual tape library (VTL) instantiations, the drive may be emulated in software.

Similarly, in some embodiments the access control parameters may be stored in association with a library controller 110 in lieu of, or in addition to, the drive controller memory 124. For example, at operation 330 the library controller may transmit the access control parameters to a drive controller, and at operation 335 the library controller may store the access control parameters.

In some embodiments, logic operational in one or more of the controllers may use the data table depicted in FIG. 4 to manage access to the resources of cartridge library 100 in response to requests from host computers such as host computer 150 for one or more resources managed by the cartridge library 100. FIG. 5 is a flowchart illustrating operations in an embodiment of a method access control management. In one embodiment, the operations of FIG. 5 may be implemented by the access control module 126 associated with the driver controller(s) 120 in the cartridge library. In alternate embodiments, the operations of FIG. 5 may be implemented by the library controller 110, alone or in combination with the drive controller(s) 120.

Figure 5:
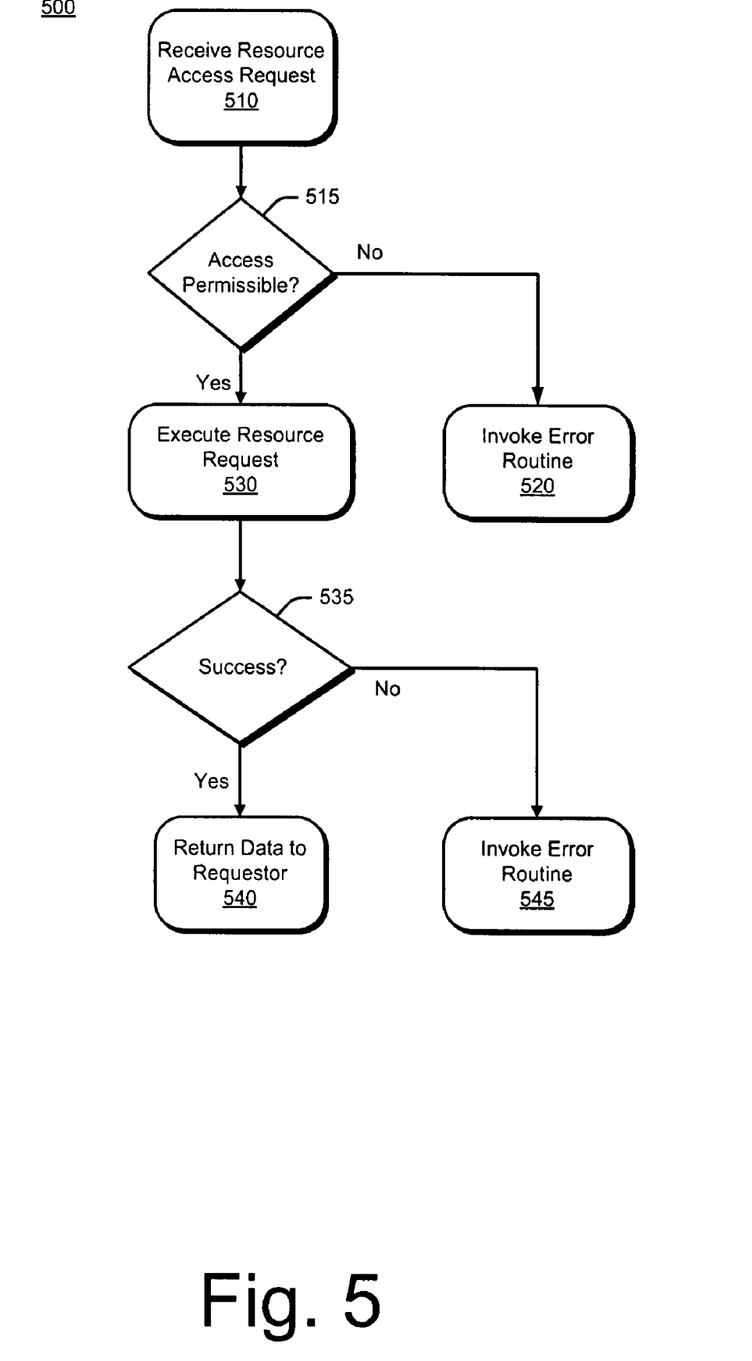
FIG. 5 is a flowchart illustrating operations in an embodiment of a method for enforcing access control parameters.

Referring to FIG. 5, at operation 510 a resource access request is received. For example, a user may originate a resource access request from a computer such as, e.g., host computer 150, which is received in a drive controller. At operation 515 it is determined whether the access request is permissible. In some embodiments, when the access request is received in the drive controller 120, the access control module 126 parses the access request to obtain a user identifier and/or a host server identifier associated with the service request. The access control module 126 then searches the data tables using the identifier(s) extracted from the service request for a matching record(s). If no record is located, then control passes to operation 520 and an error routine is invoked. The error routine may include generating a message which indicates that the user and/or computer which generated the service request is not authorized to access resources managed by cartridge library 100. Further, the error routine may include entering the access request into a log such as, e.g., the error log 252 depicted in FIG. 2.

By contrast, if at least one matching record is located in the data tables, then the access request is compared to the information in the matching record(s) to determine whether the access request is consistent with the access rights defined in the table. For example, the command associated with the access request may be extracted from the service request, and the data table may be searched to determine whether the requester has rights to execute the service request. Further, the time at which the access request was received (or generated) may be determined by obtaining a time stamp associated with the request. The time stamp may be compared with the allowable time references in the data table for the command.

If the information in the data table 400 indicates that the access request is impermissible, then control passes to operation 520 and an error routine is invoked. The error routine may include generating a message which indicates that the user and/or computer which generated an unauthorized access request for resources managed by cartridge library 100. Further, the error routine may include entering the access request into a log such as, e.g., the error log 252 depicted in FIG. 2.

If, at operation 515, the access request is permissible, then control passes to operation 530 and the drive controller(s) execute the resource request. If, at operation 535, the resource request is successfully executed, then the data from the resource request is returned to the requester (operation 540). The data may include data resulting from a read operation and/or an acknowledgment indicating the status of a read, write, or copy operation.

By contrast if the resource request is not successfully executed, then control passes to operation 545 and an error routine is invoked. The error routine may include generating a message which indicates that the access request for resources managed by cartridge library 100 was unsuccessful. Further, the error routine may include entering the access request into a log such as, e.g., the error log 252 depicted in FIG. 2.

Thus, the operations of FIGS. 3 and 5 permit a cartridge drive controller to manage access control for resources managed by a cartridge library. These operations may be implemented as logic instructions stored in a computer-readable medium such as a memory module. However, in other embodiments the logic may be implemented in hardware or a combination of hardware and software. The logic instructions, can be stored on any computer-readable medium for use by or in connection with an instruction execution system, apparatus, or device, such as a computer-based system, processor-containing system, or other system that can fetch and execute instructions. In the context of this document, a computer-readable medium can be any means that can contain or store a program for use by or in connection with the instruction execution system, apparatus, or device. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A cartridge library, comprising:
a management component;
a library controller comprising a first processor module and a memory medium communicatively connected to the first processor module;
a cartridge drive controller comprising a second processor module and a memory medium communicatively connected to the second processor module,
wherein the management component is configured to:
receive at least one access control parameter, wherein the at least one access control parameter identifies at least one of a user, a server, a command, or a time;
verify the received at least one access control parameter by verifying that a resource of the cartridge library identified by the at least one access control parameter is a valid resource in the cartridge library; and
in response to the verifying, send the at least one control parameter to the cartridge drive controller;
wherein the memory medium of the cartridge drive controller stores logic instructions which, when executed, cause the second processor module to:
record, in the memory medium of the cartridge drive controller, the at least one access control parameter received from the management component;
receive a request for at least one resource of the cartridge library, wherein the request for the at least one resource of the cartridge library includes a request to access a storage cartridge of the cartridge library; and use the access control parameter in determining whether to grant access to the at least one resource of the cartridge library in response to the request.

2. The cartridge library of claim 1, wherein the memory medium of the cartridge drive controller stores logic instructions which, when executed, cause the second processor module to receive via a user interface in the management component instructions which assign access rights to a user of the cartridge library, wherein the access control parameter comprises the access rights.

3. The cartridge library of claim 2, wherein the access rights limit the user's ability to perform at least one command on at least one resource of the cartridge library during at least one time period.

4. The cartridge library of claim 1, wherein using the access control parameter in determining whether to grant access to the at least one resource of the cartridge library comprises:
obtaining an identifier from the request for at least one resource, wherein the identifier identifies a user of the cartridge library;
locating a record associated with the identifier in an access control file; and
granting access to the at least one resource when the request is consistent with access control parameters in the access control file.

5. The cartridge library of claim 1, wherein the memory medium of the cartridge drive controller stores logic instructions which, when executed, cause the second processor module to:
obtain an identifier from the request for at least one resource, wherein the identifier identifies a user of the cartridge library;
locate a record associated with the identifier in an access control file; and
invoke an error routine when the request is inconsistent with access control parameters in the access control file.

6. The cartridge library of claim 5, wherein the memory medium of the cartridge drive controller stores logic instructions which, when executed, cause the second processor module to:
transmit an error message to the user, wherein the error message indicates that a requested resource is unavailable to the user at this time; and
record the error message in a log.

7. The cartridge library of claim 1, comprising multiple storage cartridges and plural cartridge drives to access data on the storage cartridges, and wherein the request is to access the data on one of the storage cartridges.

8. The cartridge library of claim 1, wherein the access control parameter includes an identifier of the storage cartridge.

9. The cartridge library of claim 8, wherein the cartridge drive controller is to further verify, based on the identifier of the storage cartridge, that the storage cartridge is a valid resource in the cartridge library.

10. A method of managing access to data stored in a cartridge library, comprising:
receiving, in a management component coupled to the cartridge library, at least one access control parameter, wherein the at least one access control parameter identifies at least one of a user, a server, a command, or a time;
verifying the received at least one access control parameter by verifying that a resource of the cartridge library identified by the at least one access control parameter is a valid resource in the cartridge library;
in response to the verifying, recording, in a memory medium coupled to the cartridge library, the at least one access control parameter;
receiving, by a controller in the cartridge library, a request for at least one resource of the cartridge library, wherein the request for the at least one resource of the cartridge library includes a request to access a storage cartridge of the cartridge library; and
using, by the controller, the access control parameter in determining whether to grant access to the at least one resource of the cartridge library in response to the request.

11. The method of claim 10, wherein receiving, in the management component coupled to the cartridge library, the at least one access control parameter comprises receiving, via a user interface in the management component, instructions which assign access rights to a user of the cartridge library.

12. The method of claim 11, wherein the access rights limit the user's ability to perform at least one command on at least one resource of the cartridge library during at least one time period.

13. The method of claim 10, wherein recording, in the memory medium, the at least one access control parameter comprises:
transmitting the at least one access control parameter to at least one library controller; and
storing the at least one access control parameter in a data file maintained by the at least one library controller.

14. The method of claim 10, wherein recording, in the memory medium, the at least one access control parameter comprises:
storing the at least one access control parameter in a data file in a removable non-volatile storage medium coupled to the management component.

15. The method of claim 10, wherein using the access control parameter in determining whether to grant access to the at least one resource of the cartridge library comprises:
obtaining an identifier from the request for at least one resource, wherein the identifier identifies a user of the cartridge library;
locating a record associated with the identifier in an access control file; and
granting access to the at least one resource when the request is consistent with access control parameters in the access control file.

16. The method of claim 10, wherein using the access control parameter in determining whether to grant access to the at least one resource of the cartridge library comprises:
obtaining an identifier from the request for at least one resource, wherein the identifier identifies a user of the cartridge library;
locating a record associated with the identifier in an access control file; and
invoking an error routine when the request is inconsistent with access control parameters in the access control file.

17. The method of claim 16, wherein invoking the error routine when the request is inconsistent with access control parameters in the access control file comprises:
transmitting an error message to the user, wherein the error message indicates that a requested resource is unavailable to the user at this time; and
recording the error message in a log.

18. The method of claim 10, wherein the cartridge library includes multiple storage cartridges and plural cartridge drives to access data on the storage cartridges, and wherein receiving the request comprises receiving the request to access the data on one of the storage cartridges.

19. The method of claim 10, further comprising:
the management component recording information relating to an error associated with loading the storage cartridge, wherein the recorded information describes a position of a movable mechanical component for loading the storage cartridge.

20. The method of claim 10, wherein the access control parameter includes an identifier of the storage cartridge.

21. The method of claim 20, further comprising verifying, based on the identifier of the storage cartridge, that the storage cartridge is a valid resource in the cartridge library.

22. A computer program product comprising logic instructions stored on a computer readable storage medium which, when executed by a processor, cause the processor to manage access requests in a cartridge library by performing operations, comprising:
receiving, in a management component coupled to the cartridge library, at least one access control parameter, wherein the at least one access control parameter identifies at least one of a user, a server, a command, or a time;
verifying the received at least one access control parameter by verifying that a resource of the cartridge library identified by the at least one access control parameter is a valid resource in the cartridge library;
in response to the verifying, recording, in a memory medium coupled to the cartridge library, the at least one access control parameter;
receiving a request for at least one resource of the cartridge library, wherein the request for the at least one resource of the cartridge library includes a request to access a storage cartridge of the cartridge library; and
using the access control parameter in determining whether to grant access to the at least one resource of the cartridge library in response to the request.

23. The computer program product of claim 22, further comprising logic instructions stored on the computer readable storage medium which, when executed by the processor, cause the processor to manage access requests in the cartridge library by performing operations, comprising receiving via a user interface in the management component instructions which assign access rights to a user of the storage system.

24. The computer program product of claim 23, wherein the access rights limit the user's ability to perform at least one command on at least one resource of the cartridge library during at least one time period.

25. The computer program product of claim 22, further comprising logic instructions stored on the computer readable storage medium which, when executed by the processor, cause the processor to manage access requests in a cartridge library by performing operations, comprising:
transmitting the at least one access control parameter to at least one library controller; and
storing the at least one access control parameter in a data file maintained by the at least one library controller.

26. The computer program product of claim 22, further comprising logic instructions stored on the computer readable storage medium which, when executed by the processor, cause the processor to manage access requests in a cartridge library by performing operations, comprising:
storing the at least one access control parameter in a data file in a removable non-volatile storage medium coupled to the management component.

* * * * *